United States Patent
Lehman et al.

(10) Patent No.: US 9,625,313 B2
(45) Date of Patent: Apr. 18, 2017

(54) OPTICAL METER AND USE OF SAME

(71) Applicant: NATIONAL INSTITUTE OF STANDARDS AND TECHNOLOGY, Gaithersbrug, MD (US)

(72) Inventors: John Lehman, Boulder, CO (US); Paul Williams, Erie, CO (US); Robert Lee, Longmont, CO (US); Frank Maring, Lafayette, CO (US)

(73) Assignees: THE UNITED STATES OF AMERICA, AS REPRESENTED BY THE SECRETARY OF COMMERCE, Washington, DC (US); SCIENTECH INCORPORATED, Boulder, CO (US)

( * ) Notice: Subject to any disclaimer, the term of this patent is extended or adjusted under 35 U.S.C. 154(b) by 182 days.

(21) Appl. No.: 14/313,999

(22) Filed: Jun. 24, 2014

(65) Prior Publication Data
US 2014/0307253 A1 Oct. 16, 2014

(51) Int. Cl.
*G01J 1/56* (2006.01)

(52) U.S. Cl.
CPC ..................... *G01J 1/56* (2013.01)

(58) Field of Classification Search
CPC .... G01J 1/42; G01J 1/4257; G01J 2001/4247; G01J 1/50; G01J 1/58; G01J 1/56
USPC .................. 356/213, 445; 250/216
See application file for complete search history.

(56) References Cited

U.S. PATENT DOCUMENTS

| | | | | |
|---|---|---|---|---|
| 4,170,904 A | * | 10/1979 | Fischell | B64G 1/26 244/166 |
| 4,260,255 A | * | 4/1981 | Wachs | G01J 1/4257 356/222 |
| 4,708,494 A | * | 11/1987 | Kleinerman | G01D 5/268 250/361 R |
| 5,166,504 A | * | 11/1992 | Protz | B23K 26/04 250/201.1 |
| 7,315,003 B2 | * | 1/2008 | Maring | G01G 7/02 177/203 |
| 2007/0187603 A1 | * | 8/2007 | Jankowiak | G01J 5/46 250/338.1 |
| 2013/0197350 A1 | * | 8/2013 | Lindstrom | G01H 11/00 600/411 |

OTHER PUBLICATIONS http://www.eeherald.com/section/design-guide/mems_application_introduction.html.*

(Continued)

*Primary Examiner* — Tarifur Chowdhury
*Assistant Examiner* — Mohamed K Amara
(74) *Attorney, Agent, or Firm* — Toby D. Hain (57) ABSTRACT

An optical meter includes a force member to receive a force and a reflector disposed on the force member to receive radiation and to communicate a pressure of the radiation to the force member. The reflector includes a reflective surface, and the force member is configured to be displaced in response to receiving the force comprising the pressure. The optical meter is configured to measure a power of the radiation, an energy of the radiation, or a combination thereof based on the pressure. A process for measuring a property of radiation includes receiving radiation by the reflector, reflecting radiation from the reflective surface, communicating a pressure from the reflector to the force member, and displacing the force member.

20 Claims, 9 Drawing Sheets

(56) References Cited

OTHER PUBLICATIONS https://en.wikipedia.org/wiki/Radiation_pressure.*
"Use of radiation pressure for measurement of high-power laser emission" to Williams et al. Opt. Lett., 38 (20) (2013).*

* cited by examiner

OPTICAL METER AND USE OF SAME

STATEMENT REGARDING FEDERALLY SPONSORED RESEARCH

This invention was made with United States government support from the National Institute of Standards and Technology. The government has certain rights in the invention.

CROSS REFERENCE TO RELATED APPLICATIONS

This application claims the benefit of U.S. Provisional Patent Application Ser. No. 61/839,417 filed Jun. 26, 2013, the disclosure of which is incorporated herein by reference in its entirety.

BACKGROUND

Optical power measurement of high-power lasers involved absorbing as much of the laser power as possible in a power sensor with a subsequent determination of a resulting temperature change of the power sensor. This approach provided measured power to 1% accuracy levels. Thermal calorimetric power meters absorbed the incident optical power such that the sensor volume and response period scaled linearly with optical energy capacity but with relatively slow response times. Flowing water optical power meters measured optical power directly, which provided faster response times that were less dependent on power capacity. However, flowing water optical power meters had sizes that still scaled linearly with optical power capacity. For both types of power meter, high accuracy was dependent on a majority of the optical power being absorbed by the sensor, which precluded high-accuracy absolute power monitoring during laser use.

Accordingly, advances in methods and equipment for optical power determination would be advantageous and received favorably in the art.

BRIEF DESCRIPTION

The above and other deficiencies are overcome by, in an embodiment, an optical meter comprising: a force member to receive a force; and a reflector disposed on the force member to receive radiation and to communicate a pressure of the radiation to the force member, the reflector comprising a reflective surface, wherein the force member is configured to be displaced in response to receiving the force comprising the pressure, and the optical meter is configured to measure a power of the radiation, an energy of the radiation, or a combination comprising at least one of the foregoing, based on the pressure.

Further disclosed is an optical meter system comprising: an optical meter comprising: a direct-load balance comprising: a force member; and a restoring force system in electromagnetic communication with the force member; a reflector disposed on the force member to receive radiation and to communicate a pressure of the radiation to the force member, the reflector comprising a reflective surface; and a thermal barrier interposed between the force member and the reflector; and a housing in which the optical meter is disposed; the housing comprising: a baffle, an insulator to thermally insulate the optical meter, an optical window to communicate the radiation to the reflector, or a combination comprising at least one of the foregoing, wherein the force member is configured to be displaced in response to receiving the force comprising the pressure, and the optical meter is configured to measure a power of the radiation, an energy of the radiation, or a combination comprising at least one of the foregoing, based on the pressure.

Additionally disclosed is a process for measuring a property of radiation, the process comprising: subjecting an optical meter to radiation, the optical meter comprising: a force member; and a reflector disposed on the force member and comprising a reflective surface; receiving the radiation by the reflector; reflecting the radiation from the reflective surface; communicating a pressure of the radiation from the reflector to the force member; and displacing the force member in response to receiving the force comprising the pressure to measure the property, wherein the property comprises a power of the radiation, an energy of the radiation, or a combination comprising at least one of the foregoing, based on the pressure.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been found that an optical meter herein measures power or energy of radiation from a pressure of the radiation that is reflected by the optical meter. Many light sources, e.g., some lasers, emit radiation at power levels sufficient to damage materials such that measuring the power of such high-power radiation is difficult or prone to being inaccurately performed. Some calorimetric-based instruments available for power measurement of high-power radiation have a slow response time, and the radiation is absorbed and not available after being absorbed by the calorimetric instrument. The optical meter advantageously does not rely on absorption of radiation, has a size or response time that does not scale with power capacity, and measures power or energy with high reflectance such that the measured radiation is available for use during operation of the optical meter. Moreover, the optical meter is relatively low-cost, accurate, and power-scalable and provides fast characterization of optical power.

In an embodiment, the optical meter measures the optical power of radiation from radiation pressure without significant absorption of optical power from the radiation. In an embodiment, absolute optical power is determined by comparison to a reference force or an equivalent mass. Since a reflective surface of the optical meter reflects the radiation, the optical meter does not perturb the power of the radiation. As a result, optical power is determined in real time while the radiation reflected from the optical meter is available for use.

Without wishing to be bound by theory, it is believed that the optical pressure of the radiation on a reflector of the optical meter involves a change in a momentum of photons of the radiation. Radiation that impinges on the reflector therefore imparts a force on the reflector. The force is proportional to the optical power of the radiation as given by formula (1)

$$F=(2P/c)r\cos(\theta) \qquad (1)$$

Where r is an effective reflectivity (r=R+(1−R)n/2) of the reflector; R is a reflectivity of the reflector; n is a fraction of the radiation absorbed by the reflector; θ is an angle of incidence of the radiation with respect to a normal to a surface of the reflector; and c is a speed of light. The effective reflectivity r represents an amount of momentum transferred to the reflector from the radiation where a photon absorbed by the reflector transfers all momentum to the reflector, and a photon reflected by the reflector transfers twice its momentum to the reflector. It should be recognized that a maximum power-to-force conversion factor is $2/c=6.67\times10^{-9}$ Newtons per Watt (N/W) for radiation incident on a reflector that is completely reflective.

Figure 1:
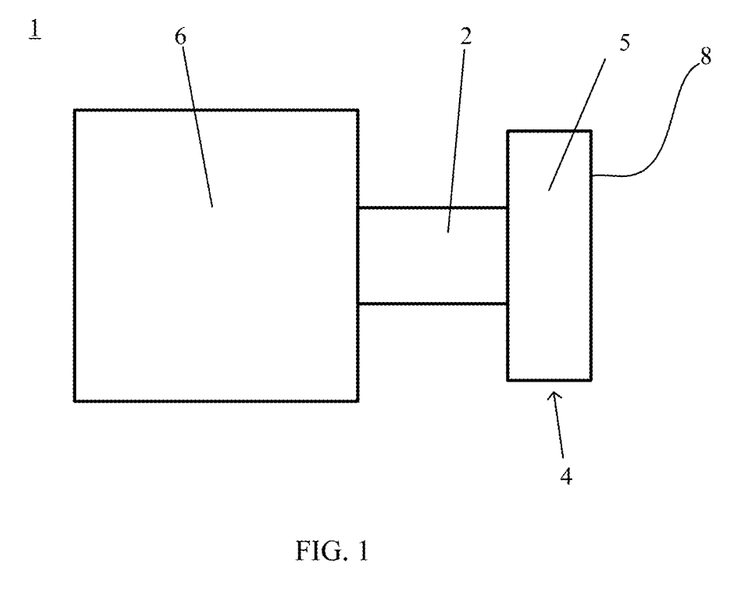
FIG. 1 shows a cross-section of an optical meter.

According to an embodiment, with reference to FIG. 1, optical meter 1 includes reflector 4 disposed force member 2. Reflector 4 is configured to receive radiation and to communicate a pressure of the radiation to force member 2. Reflector 4 includes substrate 5 and reflective surface 8. Force member 2 is configured to be displaced in response to receiving the force comprising the pressure, and optical meter 1 is configured to measure a power of the radiation, an energy of the radiation, or a combination thereof based on the pressure.

Figure 2:
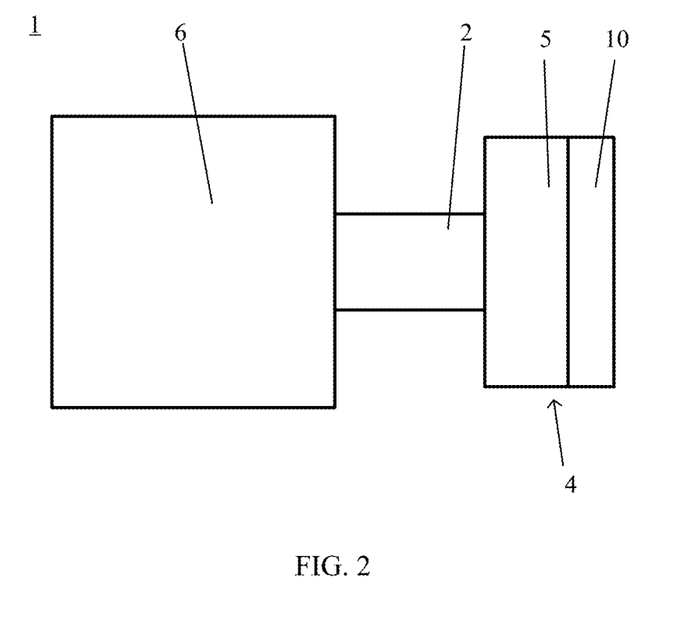
FIG. 2 shows a cross-section of an optical meter.
Figure 3:
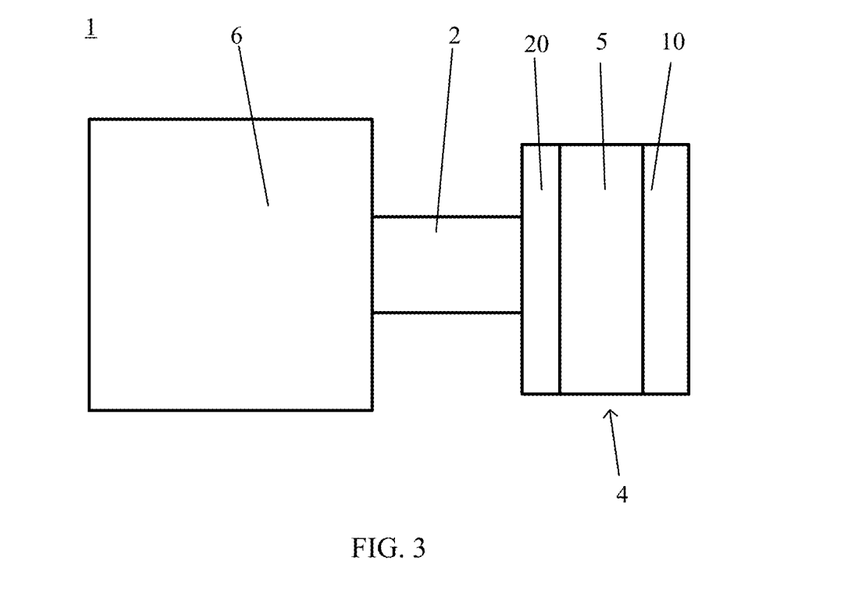
FIG. 3 shows a cross-section of an optical meter.

In an embodiment, as shown in FIG. 2, optical meter 1 includes coating 10 disposed on reflector 4. Coating 10 is selected to achieve a reflectance of reflector 4. Thermal barrier 20 is interposed between force member 2 and substrate 5 of reflector 4 in some embodiments as shown in FIG. 3.

Figure 4:
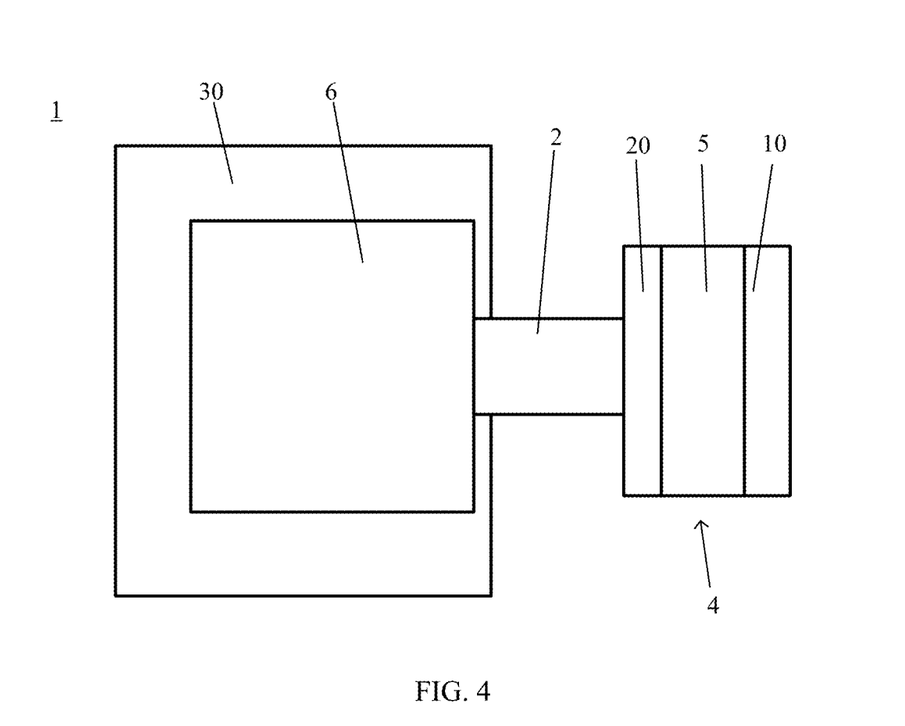
FIG. 4 shows a cross-section of an optical meter.

As shown in FIG. 4, insulator 30 is surroundingly disposed around balance 6. Force member 6 protrudes from balance 6 through insulator 30. Insulator 30 can completely or partially surround balance 6 to insulate balance 6 from thermal or motion interference.

Substrate 5 of reflector 4 is a material selected to reflect the radiation. In an embodiment, substrate 5 reflects all or substantially all of the wavelengths of the optical spectrum of the radiation. Exemplary substrates include a dielectric (e.g., glass, silicon, and the like), a metal (e.g., copper, gold, titanium, vanadium, chromium, yttrium, zirconium, niobium, molybdenum, technetium, ruthenium, rhodium, palladium, silver, tantalum, tungsten, rhenium, osmium, iridium, platinum, thallium, lead, stainless steel, and the like), and the like. Reflective surface 8 can be highly polished for reflection of the radiation or can be have a surface texture that scatters the radiation so that the radiation is not transmitted or absorbed by substrate 5. In certain embodiments, substrate 5 is a material (e.g., polymer, clay, glass, metal, and the like) on which coating 10 is disposed so that substrate 5 may or may not reflect all or substantially all of the wavelengths of the optical spectrum of the radiation.

In some embodiments, reflective surface 8 is an exposed surface of substrate 5 for incident radiation. In an embodiment, reflective surface 8 is an exposed surface of coating 10 disposed on substrate 5. In one embodiment, reflective surface 8 is interposed between substrate 5 and coating 10. Coating 10 is a protective layer for substrate 5, a reflective layer, or a combination thereof. According to an embodiment, coating 10 is a metal film, e.g., gold, silver, aluminum, and the like. In certain embodiments, coating 10 is a highly reflective material such as a tape, a paint, and the like that reflect the radiation. According to an embodiment, reflector 4 includes coating 10 that includes gold disposed on substrate 5 that includes silicon.

Thermal barrier 20 is interposed between substrate 5 of reflector 4 and force member 2. Thermal barrier 20 insulates force member 2 and scale 6 from heat transfer with reflector 4, including substrate 5 or coating 10. Thermal barrier 20 includes a material that effectively insulates force member 2 and reflector 4 without interfering with reflection of the radiation from the reflector. Exemplary thermally insulating material for thermal member 20 includes a polymer (e.g., a polyamide, polyimide, polyetherimide, polysiloxane, polyphenylsulfone, perfluorinated polymers such as polytetrafluoroethylene, and the like), ceramic, glass, and the like. In an embodiment, thermal barrier 20 is a foam plastic that includes, e.g., foamed polyethylene, polytetrafluoroethylene, polypropylene, or the like. Other dielectrics also can be used in thermal barrier 20, including an aerogel.

Aerogel particles have a low density and low thermal conductivity. The aerogel can have a particle density of less than or equal to 100 kg/m$^3$ and a thermal conductivity of less than or equal to 25 milliwatts per milliKelvin (mW/mK), and specifically less than or equal to 15 mW/mK. The aerogel includes an inorganic aerogel, organic aerogels, or combination thereof. Inorganic aerogels include those formed from an inorganic oxide of silicon, aluminum, titanium, zirconium, hafnium, yttrium, vanadium, and the like, with silica aerogels being a particular embodiment. Organic aerogels can be prepared from carbon, polyacrylates, polystyrene, polyacrylonitriles, polyurethanes, polyimides, polyfurfuryl alcohol, phenol furfuryl alcohol, melamine formaldehydes, resorcinol formaldehydes, cresol, formaldehyde, polycyanurates polyacrylamides, epoxides, agar, agarose, and the like.

Some aerogels are readily available commercially, e.g., in a powdered form. A size of aerogel particles can be reduced to a desired dimension or grade by jet-milling or other size reduction techniques. Aerogel particles milled to a particle size from 5 μm to 1 mm (e.g., as in aerogel beads) can be used in some embodiments. It is contemplated that smaller aerogel particles form a more uniform composition with other components of the insulating material. In one embodiment, the aerogel has a pore sizes, e.g., an average pore size of less than or equal to 100 nm.

The aerogels can be in a hydrophilic or hydrophobic form, depending on adhesion to substrate 5 or force member 2. It is contemplated that an aerogel having partial surface hydrophilicity may have enhanced bonding to other materials such as an adhesive for attachments to substrate 5 or force member 2.

In some embodiments, thermal barrier 20 is a composite that includes an aerogel and another polymer, e.g., polytetrafluoroethylene (PTFE). In one embodiment, the PTFE particles are smaller than the aerogel particles and have a particle size from, e.g., 50 nm to 600 µm. In an embodiment, similarly sized PTFE particles and aerogel particles are used. According to an embodiment, to form the thermally insulating material, a composition that includes an aerogel and a binder is prepared that includes greater than or equal to 40 weight percent (wt %) aerogel, greater than or equal to 60 wt % aerogel, or greater than or equal to 80 wt % aerogel, based on a total weight of the composition. Properties such as thermal conductivity, formability, or strength are tailored in part by varying a ratio of the weight percentage of the aerogel to the polymer (e.g., PTFE) in the composition.

Thermal barrier 20 optionally includes additional components. Optional components include finely dispersed opacifiers to reduce radiative heat transfer or improve thermal performance, and include, e.g., carbon black, titanium dioxide, iron oxides, silicon carbide, molybdenum silicide, manganese oxide, polydialkylsiloxanes, and the like. Additionally, polymers, dies, plasticizers, thickeners, various synthetic and natural fibers, are optionally added, for example, to increase mechanical strength and to achieve a property such as thermal stability, rigidity, elasticity, and the like.

The material of thermal barrier 20 can be formed by a number of methods including coagulation and dry blending of the components such as the aerogel and the polymer (e.g., PTFE). In an embodiment, the composition for thermal barrier 20 is formed by combining an aqueous dispersion of aerogel particles and a polymer dispersion and coagulating the composition by agitation or addition of a coagulating agent. The coagulum is drained and dried, e.g., in an oven. The dried coagulum may be in the form of loosely bound powder, or in the form of soft cakes that may then be chilled and ground to obtain the insulating material in the form of a powder, which is processed by shaping it into a suitable shape for compliance and adherence to substrate 5 and force member 2.

In an embodiment, the aerogel includes a silicon dioxide aerogel. Other aerogels include an alumina ($Al_2O_3$) aerogel. Commercially available silica aerogels are available from Aspen Aerogels, Inc., under the names PYROGEL XT and PYROGEL XTF, which are reported to be an amorphous silica that contains a nonwoven glass or silica fiber batting as a reinforcement material, with a maximum useable temperature of 650° C.

Balance 6 is mechanically connected to force member 2 to receive a force from force member 2. In an embodiment, balance 6 is a direct-load balance including the force member. Balance 6 also includes a restoring force system. The restoring force system responds to displacement of force member 2 by the force imparted to reflector 4 by incident radiation that is reflected therefrom. Here, the restoring force system provides a restoring force to reposition force member 2 substantially to an initial position of force member 2 prior to the force being communicated to force member 2 from reflector 4. An exemplary balance is described in U.S. Pat. No. 7,315,003, which is incorporated herein by reference in its entirety. The electronic weighing devices described therein include an elastic offset, such as a spring, to offset, or counterbalance, various structures including a pan disposed on a pan mount centrally affixed. Here, reflector 4 is disposed on force member 2 that includes, e.g., the pan mount. During a period in which horizontally-travelling optical power or energy is determined, the elastic offset is removed from balance 6. In some embodiments, balance 6 includes the elastic offset to determine, e.g., a force or mass of a reference mass disposed on force member 2 or the force imparted by vertically-travelling light.

The optical meter can be produced in numerous ways. In an embodiment, balance 6 is provided having force member 2. Reflector 4 is mechanically connected to force member 2 by a fastener. The fastener can be a mechanical fastener (e.g., a clamp), an adhesive (e.g., tape, epoxy, glue, and the like), and the like. In an embodiment, reflector 4 is integrally formed with force member 2 such that force member 2 and reflector 4 are a monolithic structure.

Radiation (e.g., ultraviolet radiation, visible radiation, infrared radiation, and the like) has momentum that is inversely proportional to a wavelength of the radiation. Radiation incident on the reflector exerts a force thereon due to the momentum. For an absorbed photon of the radiation, the photon provide a force of size F, and a photon that is reflected by the reflector provides twice the force of size 2*F, i.e., twice an amount of force as the absorbed photon. See formula 1. Accordingly, the optical meter measures power or energy of radiation based on the force exerted by the radiation on the reflector. The optical meter thus has an active optical area of reflective surface 8 that scales in size to acquire optical power over a broad range of illumination sizes. The optical meter has substantially no thermal recovery time with a selectable reflectance of the reflector, e.g., substantially no absorption of the radiation. Additionally, radiation reflected by the reflector is available for use post-reflection.

The optical meter has numerous beneficial advantages. High power laser radiation changes or destroys many materials, particularly optically absorbent material, making characterization of the radiation difficult to achieve. The optical meter includes the reflector such that radiation is reflected by the reflector instead of being absorbed. The optical meter accurately measures power (or energy) of radiation including radiation having a power level that changes or destroys other materials. The optical power meter is scalable in size, is lightweight, and has a fast response time. These characteristics result from the optical meter determining power or energy of radiation by a force exerted on the force member from exposure of the reflector to the radiation instead of absorption of radiation or a thermal property change (e.g., a temperature change due to absorption of the radiation). As mentioned, radiation is reflected by the reflector, and the force exerted on the force member is twice that of an absorbed photon such that the optical meter is sensitive to differences in the power of incident radiation. Further, since the radiation is reflected by the reflector, not only is the radiation available for subsequent use, but the optical meter can simultaneously monitor power or energy of the radiation during use of the radiation. In an embodiment, the optical meter beneficially is calibrated using a reference mass or reference force. In some embodiments, a mass of an object can be calibrated using the optical meter based on a response of the optical meter to a known mass or a known force delivered by, e.g., radiation. The optical meter is used in a horizontal orientation, vertical orientation, or a combination thereof of the reflector with respect to a surface of the earth proximate to the optical meter.

Various light sources, including an industrial laser, research laser, and the like, have radiation power from a kilowatt (kW) to several megawatts (MW). Advantageously, the optical meter provides a measurement of such radiation pressure with high absolute accuracy. Moreover, the optical meter provides a comparison between an optical watt to a kilogram and can be calibrated using a mass such that the optical meter has a mass calibration at a microgram (µg) level to afford measurement of radiation power having a magnitude on the order of a Watt. Accordingly, the optical meter provides accurate measurement of optical power under calibration to a reference standard traceable mass, e.g., the S.I. kilogram or other mass artifact (e.g., a known mass of 20 g (0.196 N), available from, e.g., the United States' National Institute of Standards and Technology. Moreover, accuracy of such calibration can be tested over an operation range of the optical meter using a set of calibrated masses.

The optical meter can be produced in a size effective to measure pressure from incident radiation. In an embodiment, a size of the optical meter is less than or equal to 500 cubic decimeters ($dm^3$), specifically less than or equal to 200 $dm^3$, more specifically less than or equal to 50 $dm^3$, yet more specifically less than or equal to 20 $dm^3$, and further more specifically less than or equal to 10 $dm^3$. The optical meter has a weight that is less than or equal to 50 kg, specifically less than or equal to 20 kg, and more specifically less than or equal to 10 kg.

The reflector can have a thickness and size (e.g., surface area) effective to reflect all or a portion of incident radiation. The substrate can have a diameter or major axis that accepts the incident radiation, e.g., from 0.1 mm to 30 cm. A thickness of reflector 4 can be from several micrometers to several centimeters, including from 0.1 cm to 30 cm.

The reflector can have a selected reflectance. In an embodiment, the reflector reflects substantially all of the radiation. In some embodiments, the reflector absorbs a selected amount of the radiation. The reflector can have a reflectance greater than or equal to 0.7, specifically greater than or equal to 0.85, more specifically greater than or equal to 0.95, even more specifically greater than or equal to 0.99, and yet more specifically greater than or equal to 0.999, at a wavelength of the radiation.

In an embodiment, the incident radiation can have a power greater than or equal to 100 kilowatts (kW) and specifically from 0.01 kW to 200 kW. An amount of power absorbed by the optical meter from the radiation is substantially negligible. In one embodiment, the amount of power absorbed by the optical meter from the radiation is less than or equal to 20 milliwatts (mW), specifically less than or equal to 10 mW, and more specifically less than or equal to 1 mW.

A maximum power of the radiation can be less than or equal to a damage threshold of a component of the optical meter (e.g., the reflector). The power can be greater than or equal to 10 kilowatts (kW), specifically greater than or equal to 50 kW, more specifically greater than or equal to 100 kW, and further specifically greater than or equal to 200 kW. In some embodiments, the power is from 1 milliwatt (mW) to 200 kW, specifically from 1 kW to 100 kW, and more specifically from 10 W to 100 kW.

An irradiance of the optical meter can be any value below a damage threshold of the reflector, including less than or equal to 20 $kW/cm^2$, and specifically less than or equal to 15 $kW/cm^2$. A mass equivalent to the power of the radiation can be, e.g., from 0.1 µg to 100 mg or higher. Moreover, the force can be greater than or equal to 1 nano Newton (nN), specifically greater than or equal to 1 mN.

The radiation can include any wavelength, e.g., a wavelength from 250 nm to 10 µm, and the reflector can be optimized to reflect a wavelength of the radiation. Further, the radiation can include a beam having a transverse cross-sectional diameter (or major axis) greater than or equal to 1 mm, greater than or equal to 1 cm, more specifically greater than or equal to 20 cm, and further more specifically greater than or equal to 50 cm. The radiation can be continuous or modulated. In an embodiment, the radiation is modulated, and a repetition rate of the radiation is greater than 0 Hz, specifically greater than or equal to 0.01 Hz, and more specifically from 1 Hz to continuous. The radiation can be from various sources, including a laser, lamp (including light emitting diodes and light bulbs), celestial body (e.g., solar radiation or radiation reflected from a planet), and the like.

The optical meter has a fast time response such as less than or equal to 10 seconds, specifically less than or equal to 5 seconds, more specifically less than or equal to 1 second, and further specifically less than or equal to 0.1 seconds. Moreover, the optical meter can be subjected to the radiation for a time for obtaining the optical power or longer, with no upper limit as long as the reflector is undamaged. However, in case of damage or if desired, the reflector can be replaced or interchanged with a different reflector. The optical meter can be subjected to the radiation for a time that is greater than or equal to 0.05 seconds, specifically greater than or equal to 1 second, more specifically greater than or equal to 30 minutes, further specifically more than 1 hour, and even further specifically greater than or equal to weeks or months.

The optical meter can be used measure optical power. In an embodiment, a process for measuring optical power includes reflecting radiation from a reflective surface; exerting a pressure from the radiation on the reflective surface, communicating the pressure from the reflective surface to a force member, displacing the force member in response to receiving the pressure, applying an instrument response to restore the force member substantially to an initial position, and determining the optical power from the instrument response.

The optical meter provides time-resolved, rapid, and inexpensive optical power and energy measurements. In an embodiment, the optical meter measures laser power in a mobile laser system, a manufacturing environment (e.g., where the laser is used for cutting, welding, and the like). Further, it is contemplated that the optical meter is used terrestrially or in space.

Figure 5:
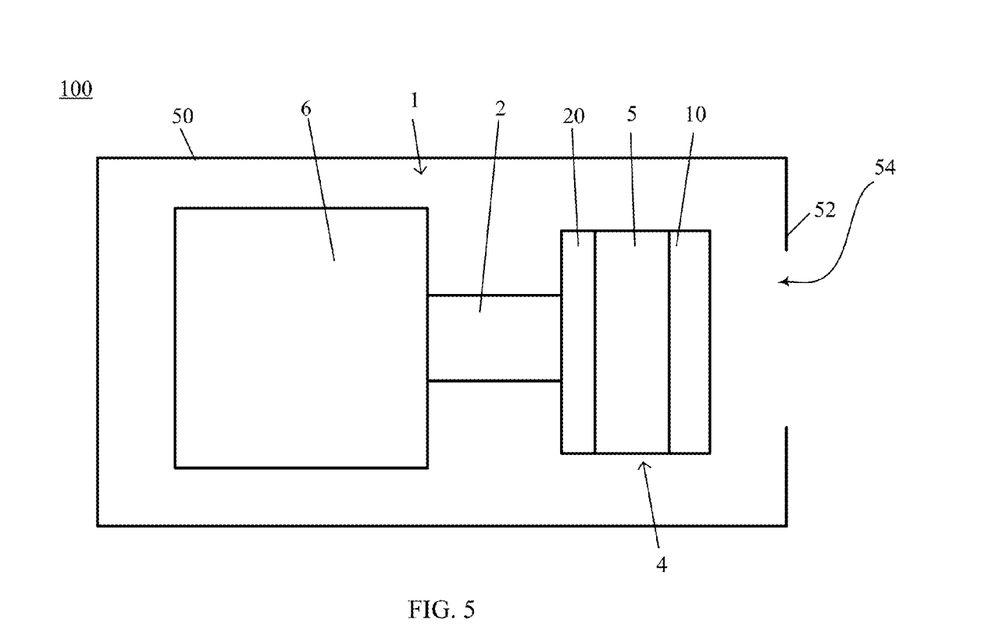
FIG. 5 shows an optical meter system.
Figure 6:
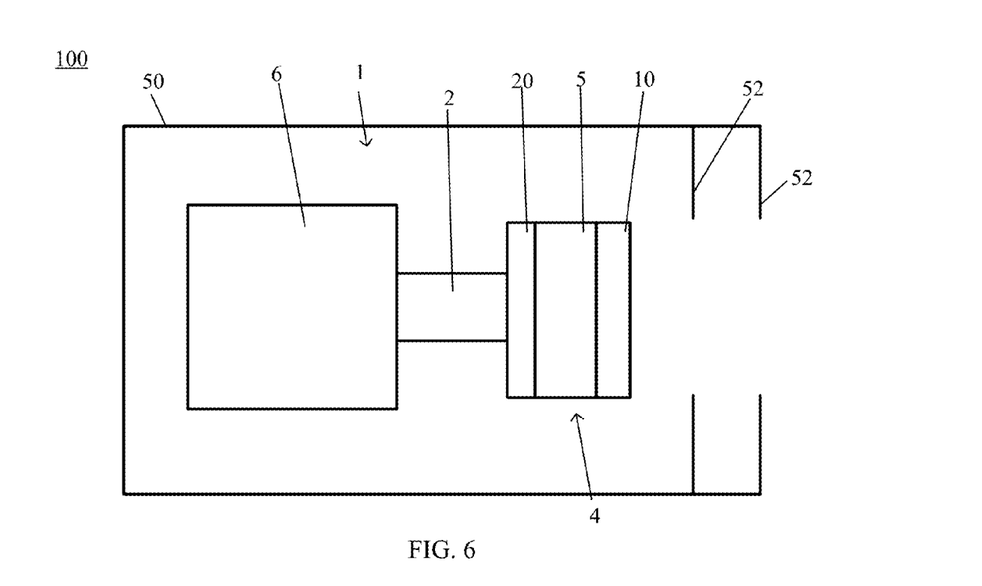
FIG. 6 shows an optical meter system.

The optical meter can be integrated into an optical meter system. In an embodiment, as shown in FIG. 5, optical meter system 100 includes optical housing 50 in which the optical meter 1 is disposed. Housing 50 can include a support (not shown) to support optical meter 1, or optical meter 1 can be disposed in contact with housing 50. Radiation is communicated to reflector 4 in housing 50 through opening 54 disposed proximate to reflector 4. Opening 54 can be a through hole such as baffle 52 or can be a plurality of baffles 52 as shown in FIG. 6. The shape of baffle 52 can be circular, ellipsoidal, polygonal, and the like. Baffle 52 inhibits air currents from affecting force member 2 and changing a force on reflector 4.

In an embodiment, housing 52 provides a controlled environment for optical meter 1. Environmental factors that are controlled include temperature, pressure, gas composition, humidity, vibrational frequency, and the like. Housing 52 also can include input and output connectors for electrical communication with optical meter 1 for controlling optical meter 1 or receiving data and status from optical meter 1.

Figure 7:
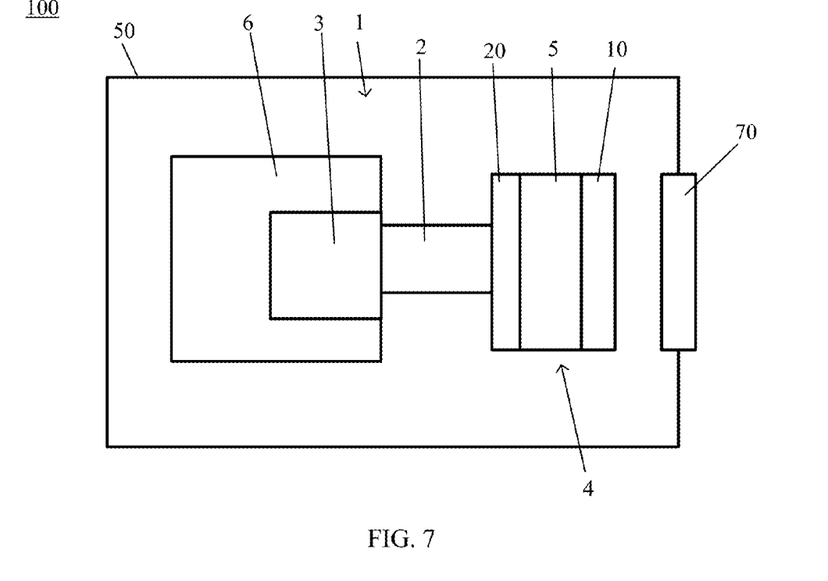
FIG. 7 shows an optical meter system.

In an embodiment, optical meter system 100 includes optical meter 1 that includes direct-load balance 6. Balance 6 includes force member 2 and a restoring force system 3 in electromagnetic communication with force member 2 to provide a restoring force in response to force member 2 being displaced. Reflector 4 is disposed on force member 2 to receive radiation and to communicate a pressure of the radiation to force member 2. Reflector 4 includes a reflective surface, and thermal barrier 20 is interposed between force member 2 and reflector 4. Housing 50 in which optical meter 1 is disposed includes baffle 52, an insulator to thermally insulate optical meter 1, optical window 70 to communicate the radiation to reflector 4, or a combination thereof. Force member 2 is configured to be displaced in response to receiving the force including the pressure, and optical meter 1 is configured to measure a power of the radiation, an energy of the radiation, or a combination thereof, based on the pressure.

Figure 8:
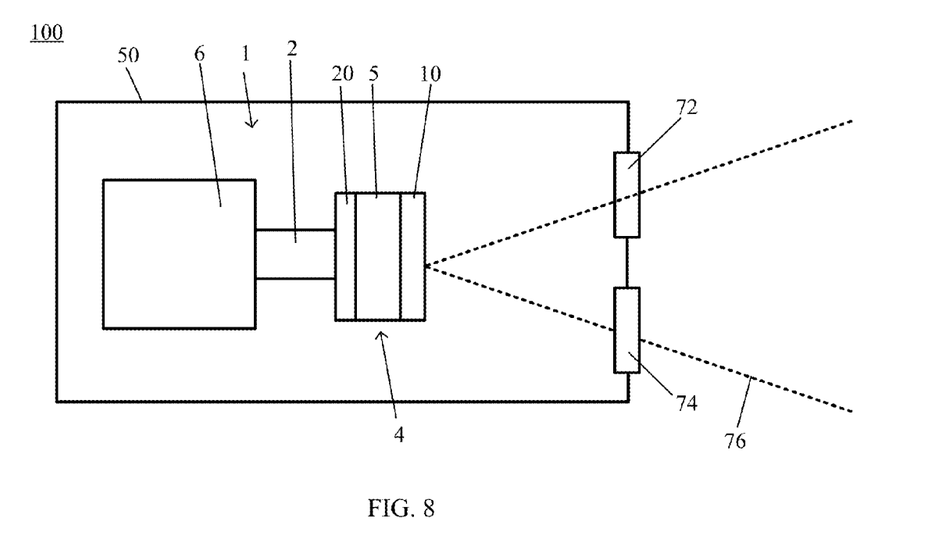
FIG. 8 shows an optical meter system.

According to an embodiment, as shown in FIG. 8, housing 50 includes a plurality of windows 70 such as entrance window 72 for communication of radiation 76 into housing 50 and exit window 74 to communicate radiation 76 out of housing 50 after reflection from reflector 4.

Figure 9:
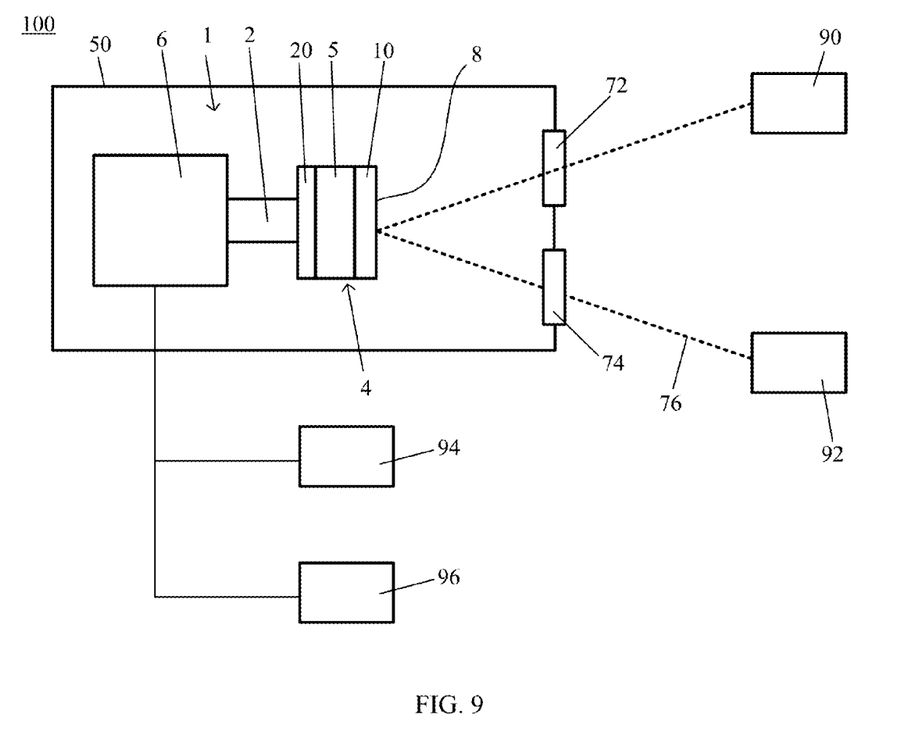
FIG. 9 shows an optical meter system.

In an embodiment, with reference to FIG. 9, optical meter system 100 includes radiation source 90 (e.g., a laser) to produce radiation 76. An optional sample 92 can be included. Sample 92 can be a workpiece, e.g., an article for welding, cutting, and the like; a spectrometer; a detector (e.g., a secondary power meter), a beam dump, and the like. An output device 94 can be connected to optical meter 1 (e.g., to balance 6). Output device can be, e.g., a data acquisition device such as an oscilloscope, voltmeter, and the like; a display; and the like. Controller 96 can be connected to output device 96, optical meter 1, radiation source 90, sample 92, or a combination thereof. Controller 96 can have two-way communication for reading and writing information and can be microprocessor, computer, or the like. In an embodiment, controller 96 is a waveform generator such as a function generator to modulate a frequency of the radiation from radiation source 90.

In an embodiment, radiation 76 propagates substantially in a plane parallel to earth's surface (disregarding a curvature of the earth), referred to herein as a horizontal plane. According to an embodiment, a portion of radiation 76 propagates substantially in a vertical plane, i.e., substantially orthogonal to earth's surface proximate to optic meter system 100. In another embodiment, a portion of radiation 76 propagates in a direction intermediate between the vertical plane and horizontal plane.

In some embodiments, reflective surface 8 of reflector 4 is configured to be perpendicular to a direction of propagation of radiation 76. In one embodiment, reflective surface 8 is configured to be at an oblique angle to a direction of propagation of radiation 76. According to an embodiment, force member 2 is configured to be displaced in a horizontal direction to receive the radiation. As used herein, "horizontal" refers to a direction that is parallel to the earth's surface proximate to optical meter 1.

Figure 10:
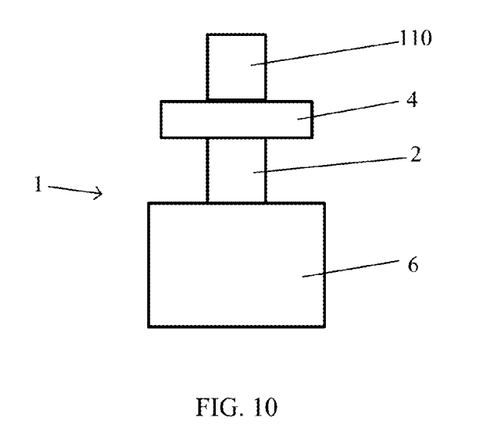
FIG. 10 shows an optical meter with a reference mass disposed thereon.
Figure 11:
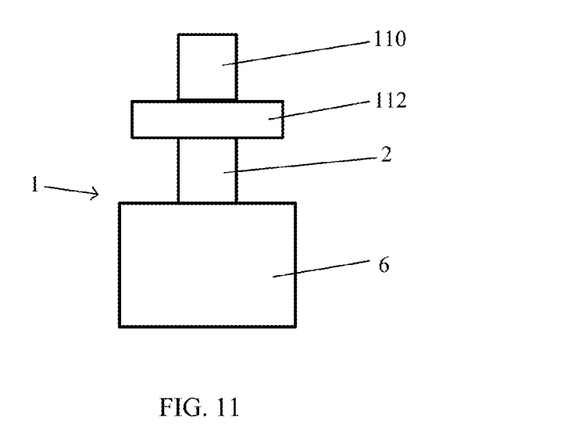
FIG. 11 shows an optical meter with a reference mass disposed thereon.

As shown in FIG. 10, in certain embodiments, optical meter 1 is configured to receive reference mass 110, and force member 2 is configured to be displaced in a vertical direction in response to receipt of the reference mass by optical meter 1. Here, balance 6 can be the direct-load balance including the elastic offset to counterbalance a force caused by the mass of reflector 4. As used herein, "vertical" refers to a direction that is perpendicular to the earth's surface proximate to a location of the optical meter. As shown in FIG. 11, in an embodiment, optical meter 1 is arranged so that force member 2 is displaced vertically by reference mass 110 disposed on pan 112. In this manner, balance 6 can be calibrated against a force from reference mass 110 having a known mass.

The optical meter can be used in various processes. According to an embodiment, a process for measuring a property of radiation includes subjecting an optical meter to radiation. The optical meter includes a force member and a reflector disposed on the force member and including a reflective surface. The process also includes receiving the radiation by the reflector, reflecting the radiation from the reflective surface, communicating a pressure of the radiation from the reflector to the force member, and displacing the force member in response to receiving the force including the pressure to measure the property. The property includes a power of the radiation, an energy of the radiation, or a combination thereof, based on the pressure. The process can further include comparing the power to a reference power produced by a reference force, a reference mass, or a combination thereof to determine a correction factor and determining an absolute optical power of the radiation from the power and the correction factor.

The apparatus and process herein are further illustrated by the following examples, which are non-limiting.

EXAMPLES

Example 1. Optical Meter System

Figure 12:
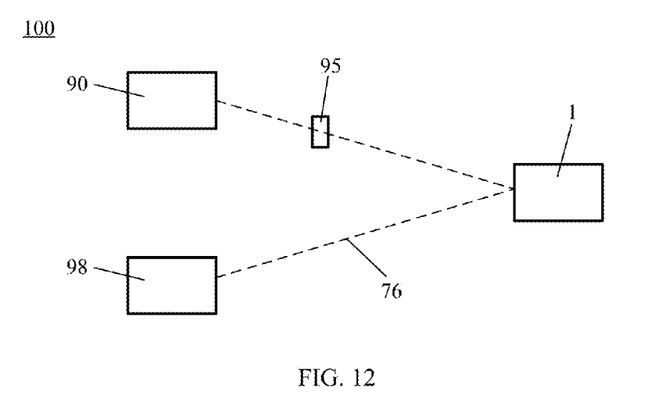
FIG. 12 shows an optical meter according to Example 1.

Details of an optical meter system and experimental results are disclosed in Williams et al., Optics Letters 38, 4248 (2013) and Williams et al., "Progress Toward Radiation-Pressure-Based Measurement of High-Power Laser Emission," submitted to Simposio de Metrologia (Queretaro, Mexico, October, 2014), the disclosures of each of which are incorporated by reference herein in their entirety. Optical meter system 100 is shown in FIG. 12 and included an optical meter, radiation source 90, beam dump 98, and lens 95. Radiation source 90 was a laser that emitted was emitted radiation 76. The optical meter included a balance, which was a direct-loading force-restoration balance that was commercially available from Scientech located in Boulder, Colo., USA. The balance had a 100 nN force resolution that corresponded to a 10 µg mass resolution. Radiation source 90 was a 530 W Yb-doped fiber laser and was operated at a wavelength centered at 1071 nm with a 5 nm full width-at-half-maximum bandwidth and that produced a maximum of 3.5 µg radiation force. Lens 95 focused radiation 76 incident on the reflector of the optical meter. The reflector included a first-surface dielectric mirror (25 mm diameter) mounted on the force member (a shaft) of the balance. Radiation 76 made an angle of incidence with respect to a normal to the reflector. The angle of incidence was varied from 7° to 45° in some experiments. The mirror reflectance was 0.997 over the range of the angles of incidence and the operating wavelengths.

Radiation 76 propagated in a horizontal plane with respect to earth's surface, and the balance was configured to operate in a vertical orientation with a reflective surface of the reflector in a vertical plane. With regard to the balance, the direct-loading design did not require gravity for mechanical operation or force measurement. A spring that typically compensated for a mass of a balance pan was removed as well as the balance pan during optical power measurements.

The balance was operated in an orientation where the force was measured horizontally. Accordingly, radiation 76 propagated from radiation source 90 (and optical power was measured) in a horizontal direction (parallel to earth's surface proximate to the balance). Consequently, vertical propagation of radiation 76 was absent in this configuration. Vertical propagation of radiation can be a practical safety issue such as with high laser powers.

Example 2. Acquisition of Radiation Force

Figure 13:
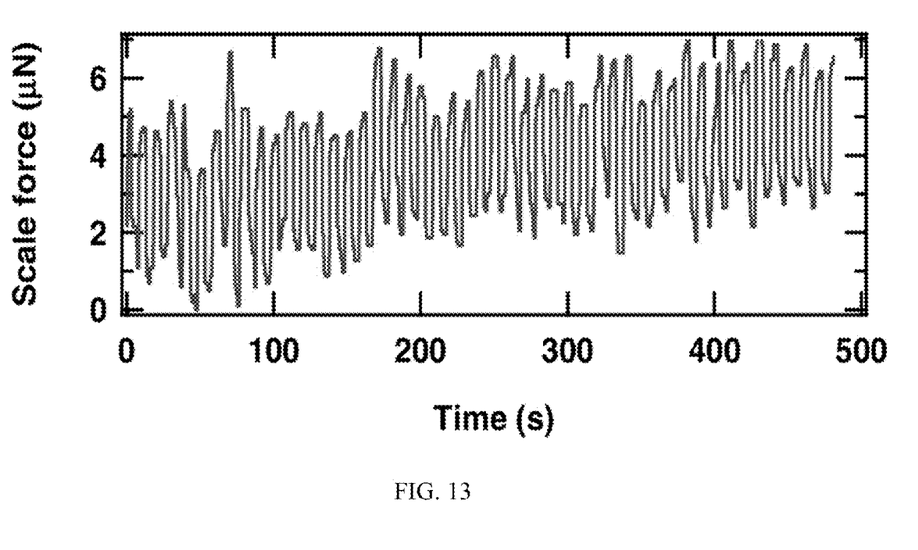
FIG. 13 shows a graph of force versus time according to Example 2.

Optical meter system 100 of Example 1 was used for acquisition of radiation force. To isolate the radiation force from noise due to a temperature drift or ambient air current, an amplitude of emission intensity of radiation 76 from radiation source 90 was modulated (100% depth) as a 0.1 Hz square wave. Internal electronics of the balance included a digitizer circuit with an effective response period from 2 seconds (s) to 4 s. The modulated radiation 76 irradiated the reflector for a total time from 5 minutes (min) to 10 min to average a signal from the optical meter. Digitized output from the balance was acquired at a sample rate of 18 Hz and converted from mass to force by use of a gravitational constant of 9.80 m/s$^2$. Typical raw output is shown in FIG. 13, which exhibited a drift due to a thermal effect and random air currents that affected the balance. An amplitude of a force from modulated radiation 76 was extracted from the drifting background by use of a quadrature heterodyne approach.

Example 3. Reduction of Environmental Effects

Figure 14:
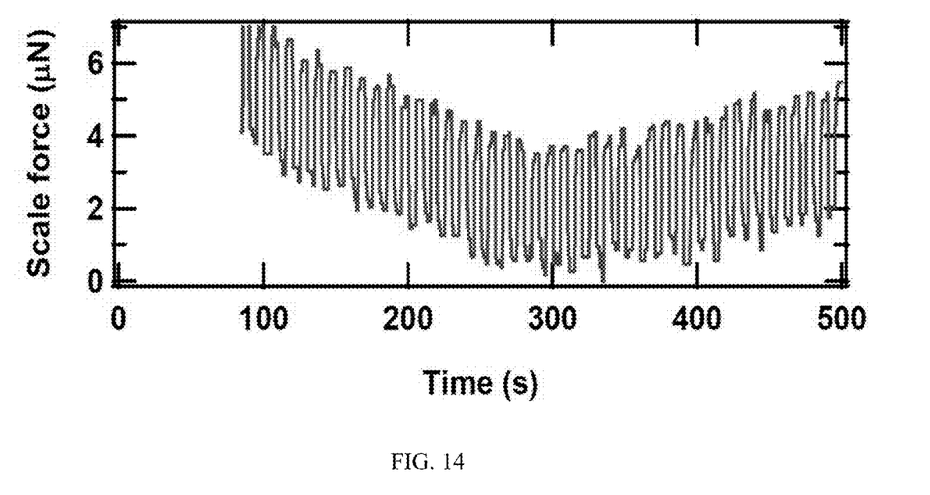
FIG. 14 shows a graph of force versus time according to Example 3.

Air currents and temperature were controlled by disposing the optical meter in a housing that blocked stray air currents from impinging on the reflector. FIG. 14 shows results of measurements from the optical meter as read from the output of the balance. The force was determined as a function of time for 522 W incident radiation power modulated at 0.1 Hz. The housing had an anti-reflection-coated entrance window to protect the reflector against external air currents.

Example 4. Radiation Force with Effective Radiation Power

Figure 15:
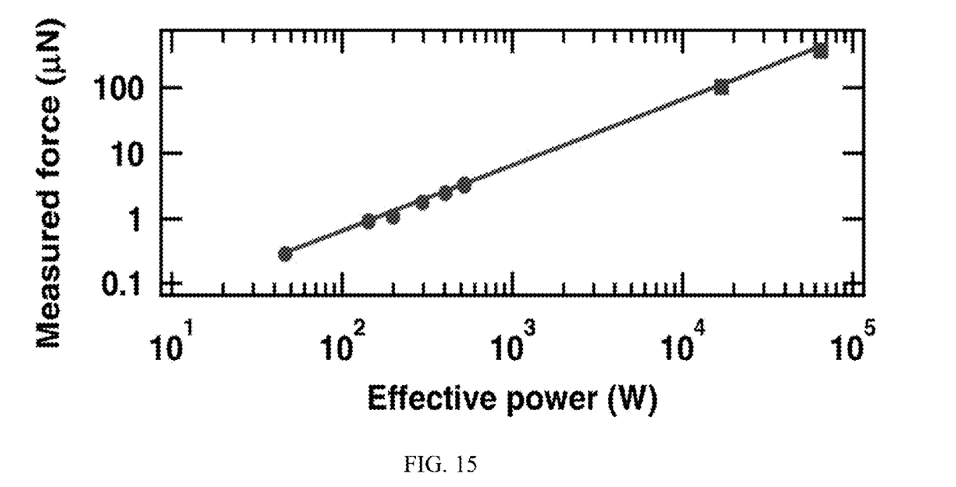
FIG. 15 shows a graph of force versus power according to Example 4.
Figure 16:
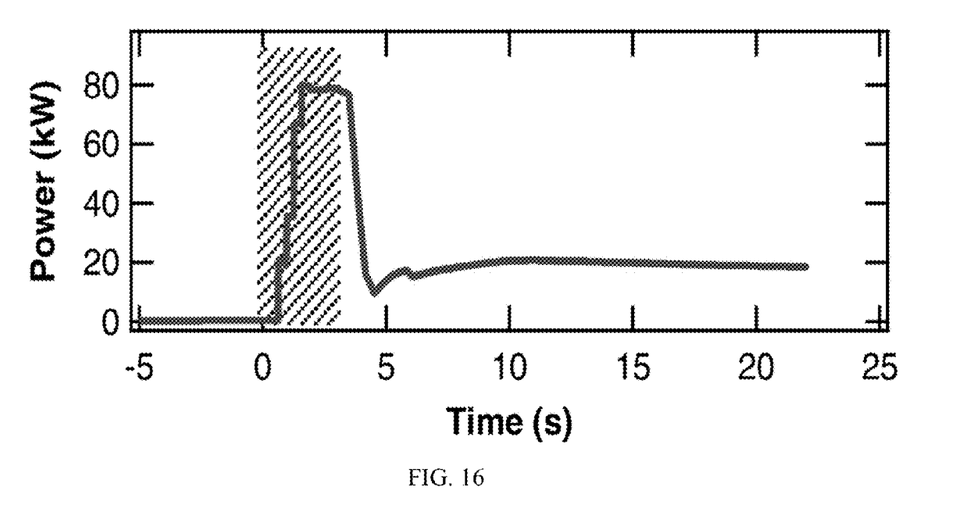
FIG. 16 shows a graph of power versus time according to Example 5.

The force on the balance was measured as a function of radiation power as the power of the radiation was varied from 0 W to 530 W. FIG. 15 shows a graph of measured force versus effective power. Data are shown as solid circles, and the effective optical power took into account reflectance of the reflector and the angle of incidence. The solid line is a theoretical prediction of the force for a given effective power. As an estimate of the noise, with no laser power incident on the scale, 0.1 µN of force was measured. Within this noise, a linear response to laser power had a best-fit slope of 6.23×10$^{-9}$ N/W, which was 7% below a theoretical value of 2/c, where c is the speed of light. For the data in FIG. 15, circles were taken at 1071 nm radiation, and the squares were taken for radiation at 10.6 µm (see Example 5).

Example 5. Higher Power Radiation

Figure 17:
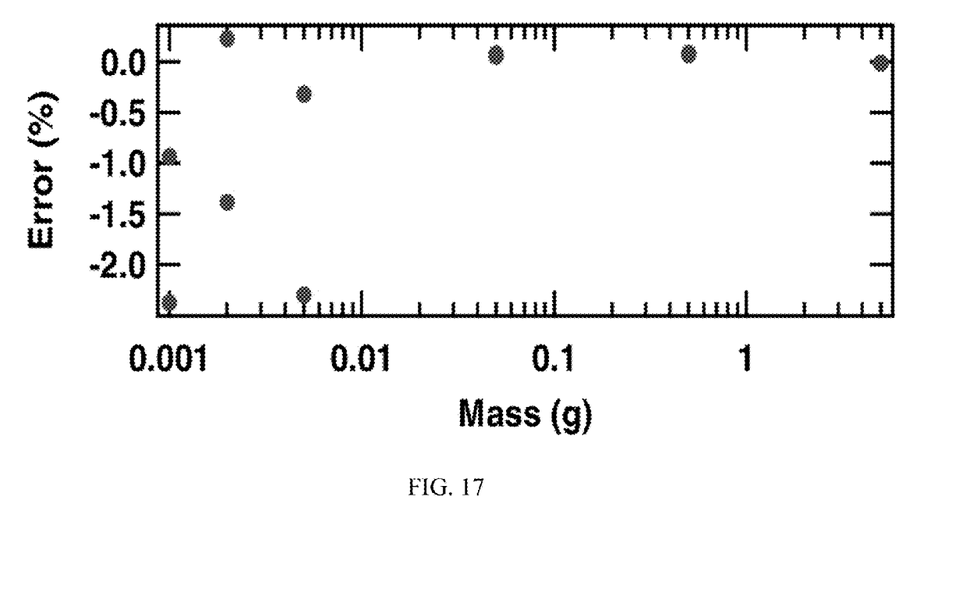
FIG. 17 shows a graph of error versus mass according to Example 6.

A 100 kW CW $CO_2$ laser was used as radiation source 90 to provide a laser beam with a diameter of 10 cm. Here, the reflector was a 20 cm diameter silicon wafer coated with gold and a surface dielectric layer and had a reflectance of 0.998 at 10.6 µm at an angle of incidence of 45°. The housing was equipped with a plurality of cylindrical baffles surrounding the input and output radiation paths instead of an optical window. A resultant force acted on the balance for a 3 s exposure of unmodulated 24 kW and 92 kW radiation powers. FIG. 15 shows the results for the 92 kW radiation power. No damage to the optical meter occurred Example 6. Measurement Uncertainty An uncertainty in measured force-to-power ratio was evaluated. For 1071 nm fiber laser measurements, incident radiation power was measured indirectly and was known to 2% uncertainty. The balance was calibrated with a known mass of 20 g (0.196 N), and the accuracy near the operation range was tested by comparison with a set of calibrated masses down to 1 mg (10 µN). The results are shown in FIG. 17. Operating the balance in the horizontal force orientation had a negligible effect on calibration due to supporting flexures operating independent of gravity. Total measurement uncertainty was several percent, which agreed with the 7% disagreement with theory.

Example 7. Angular Dependence

Radiometric effects were evaluated. Radiometric effects were ruled out as effects for the optical meter. Such radiometric effects could have obscured force measurements by air flow from a cold side of the reflector to a hot side (if there was a temperature differential from between surfaces of the reflector). The reflector allowed a fraction (0.002 to 0.003) of the incident radiation to be available for conversion to heat in the reflector. Furthermore, a glass-substrate of the reflector transmitted substantially all unreflected radiation. Radiation 76 underfilled the reflector so that differential (front-to-back) heating would have been relatively far from an edge of the reflector.

Figure 18:
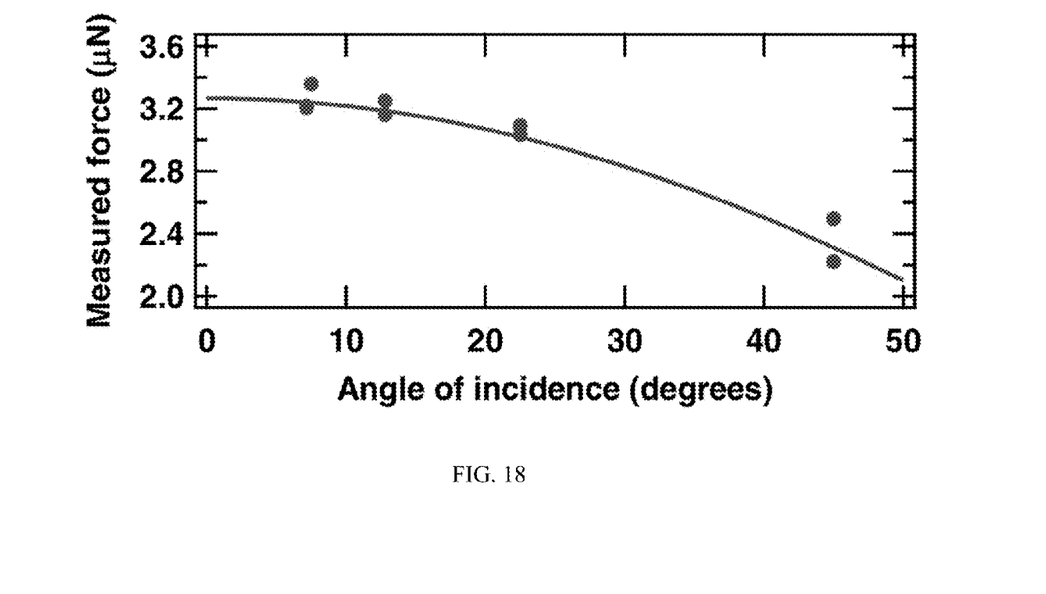
FIG. 18 shows a graph of force versus angle of incidence according to Example 7.

Additionally, since photon momentum is a vector quantity and the radiometric heating effect is scalar (independent of the light's angle of incidence), radiation force exerted on the reflector could be identified by a cosine dependence on the incident angle. The reflector was subjected to 525 W of optical power at 1071 nm with incidence angles from 7° to 45°. FIG. 18 shows measured force versus angle of incidence. The data agreed with an expected cosine behavior shown by the solid line through the data (filled circles), which indicated that the measured force was due to radiation pressure and not a heating or radiometric effect.

Example 8. Verification of Source of Radiation Pressure

Figure 19:
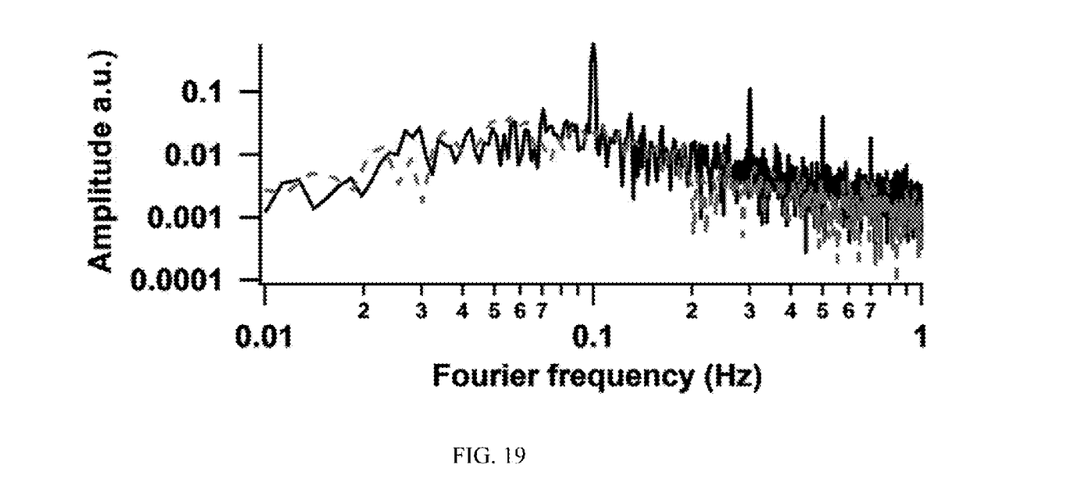
FIG. 19 shows a graph of amplitude versus Fourier frequency according to Example 8.

As another means of verifying radiation pressure as the source of the measured force by the optical meter, the incident optical power was reduced while the absorbed optical power was increased. In this manner, radiation pressure signal should decrease but any thermal (radiometric) effect would increase. The reflector of Example 1 having 0.997 reflectance was replaced with an optical target (BK 7 glass flat coated with a carbon nanotube absorbing layer) having 80% absorption of radiation 76. Here, radiation 76 was modulated and had 4.6 W at 1071 nm. No modulated force signal was observed at the 0.1 Hz modulation frequency as shown in FIG. 19. These results demonstrate that the modulation seen in FIGS. 13 and 14 was due to radiation force and not radiometric effects so that an upper limit to the size of radiometric effects was 17 dB below the radiation force signal. With reference to FIG. 19, data for the 533 W incident radiation is shown as the solid curve, and data for the 4.6 W incident radiation is shown as the dashed curve.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. An optical meter comprising:
   a force member to receive a force; and
   a reflector disposed on the force member to receive radiation and to communicate a pressure of the radiation to the force member, the reflector comprising a reflective surface,
   wherein the force member is displaced in response to receiving the force comprising the pressure, and
   the optical meter measures:
      a power of the radiation, an energy of the radiation, or a combination comprising at least one of the foregoing, based on the pressure; and
      a mass of a reference mass as a direct-load balance in response to receiving the reference mass on the reflector, and
   wherein the optical meter is calibrated to the mass of the reference mass, and the optical meter maintains calibration to the mass of the reference mass when the optical meter measures the radiation in a horizontal orientation as well as a vertical orientation of the reflector.

2. The optical meter of claim 1, further comprising a thermal barrier interposed between the force member and the reflector.

3. The optical meter of claim 1, wherein the reflective surface is perpendicular to a direction of propagation of the radiation.

4. The optical meter of claim 1, wherein the reflective surface is at an oblique angle to a direction of propagation of the radiation.

5. The optical meter of claim 1, wherein the force member is displaced in a horizontal direction in response to receipt of the radiation.

6. The optical meter of claim 1, wherein the optical meter receives the reference mass, and the force member is displaced in a vertical direction in response to receipt of the reference mass by the optical meter.

7. The optical meter of claim 1, wherein the reflector further comprises a substrate interposed between the reflective surface and the force member.

8. The optical meter of claim 1, wherein a size of the optical meter is less than or equal to 18 cubic decimeters ($dm^3$).

9. The optical meter of claim 1, wherein the reflector comprises a reflectance greater than or equal to 0.99 at a wavelength of the radiation.

10. The optical meter of claim 1, wherein the optical meter is configured to measure a power of the radiation for a temperature change of the optical meter that is less than or equal to 0.1 Kelvin.

11. The optical meter of claim 1, wherein the power is greater than or equal to 100 kilowatts (kW).

12. The optical meter of claim 1, wherein the power is from 1 mW to 200 kW.

13. The optical meter of claim 1, wherein the energy is greater than or equal to 25 kilo Joules (kJ).

14. The optical meter of claim 1, wherein the force is greater than or equal to 90 nanoNewtons (nN).

15. The optical meter of claim 1, wherein the radiation comprises a wavelength from 250 nm to 10 μm.

16. The optical meter of claim 1, wherein the radiation comprises a beam having a transverse cross-sectional diameter greater than or equal to 2 cm.

17. The optical meter of claim 1, wherein a time response of the optical meter is less than or equal 2 seconds.

18. An optical meter system comprising:
   an optical meter comprising:
      a direct-load balance comprising:
         a force member; and
         a restoring force system in electromagnetic communication with the force member;
      a reflector disposed on the force member to receive radiation, to receive a reference mass, and to communicate a pressure of the radiation to the force member, the reflector comprising a reflective surface; and
      a thermal barrier interposed between the force member and the reflector; and
   a housing in which the optical meter is disposed; the housing comprising:
      a baffle,
      an insulator to thermally insulate the optical meter,
      an optical window to communicate the radiation to the reflector, or
      a combination comprising at least one of the foregoing, wherein the force member is displaced in response to receiving the force comprising the pressure, and
the optical meter is configured to measure:
- a power of the radiation, an energy of the radiation, or a combination comprising at least one of the foregoing, based on the pressure; and
- a mass of a reference mass as the direct-load balance in response to receiving the reference mass on the reflector, and wherein the optical meter is calibrated to the mass of the reference mass, and the optical meter maintains calibration to the mass of the reference mass when the optical meter measures the radiation in a horizontal orientation as well as a vertical orientation of the reflector.

19. A process for measuring a property of radiation, the process comprising:
subjecting an optical meter to radiation, the optical meter comprising:
- a force member; and
- a reflector disposed on the force member and comprising a reflective surface;

receiving the radiation by the reflector;
reflecting the radiation from the reflective surface;
communicating a pressure of the radiation from the reflector to the force member;
displacing the force member in response to receiving the force comprising the pressure to measure the property of the radiation; and
receiving a reference mass by the reflector;
displacing the reflector and the force member in response to receiving the reference mass by the reflector; and
displacing the force member in response to receiving the force comprising the pressure to measure a mass of the reference mass,
wherein the property of the radiation comprises a power of the radiation, an energy of the radiation, or a combination comprising at least one of the foregoing, based on the pressure, and
wherein the optical meter is calibrated to the mass of the reference mass, and the optical meter maintains calibration to the mass of the reference mass when the optical meter measures the radiation in a horizontal orientation as well as a vertical orientation of the reflector.

20. The process of claim 19, further comprising:
comparing the power to:
- a reference power produced by a reference force,
- the mass of the reference mass, or a combination comprising at least one of the foregoing to determine a correction factor; and determining an absolute optical power of the radiation from the power and the correction factor.

* * * * *